J. ANDERSON.
COVER PLATE AND LOCKING DEVICE THEREFOR.
APPLICATION FILED JUNE 2, 1905.

1,130,238.

Patented Mar. 2, 1915.

WITNESSES:
C. L. Belcher
Otto S. Schainer

INVENTOR
John Anderson
BY
Wesley G. Carr
ATTORNEY

UNITED STATES PATENT OFFICE.

JOHN ANDERSON, OF PITTSBURGH, PENNSYLVANIA, ASSIGNOR TO WESTINGHOUSE ELECTRIC & MANUFACTURING COMPANY, A CORPORATION OF PENNSYLVANIA.

COVER-PLATE AND LOCKING DEVICE THEREFOR.

1,130,238.     Specification of Letters Patent.     Patented Mar. 2, 1915.

Application filed June 2, 1905. Serial No. 263,493.

*To all whom it may concern:*

Be it known that I, JOHN ANDERSON, a citizen of the United States, and a resident of Pittsburgh, in the county of Allegheny and State of Pennsylvania, have invented a new and useful Improvement in Cover-Plates and Locking Devices Therefor, of which the following is a specification.

My invention relates to electrical machines and particularly to electric motors that are utilized for propelling vehicles.

The object of my invention is to provide a plate for covering the opening in a motor frame adjacent to the commutator and simple and efficient means for detachably locking the cover plate in position.

It is usual to provide the frames of motors that are employed for operating railway vehicles with openings adjacent to the commutators in order that access may be had to the brushes and brush holders for inspection and repairs. For the purpose of protecting the commutators, so far as possible, from injury by objects encountered by the motor during operation, it is desirable to provide cover plates for the openings above referred to, which shall be securely held in position and which may be readily removed in order to permit of access to the commutator parts.

I have devised a means which meets all the requirements of satisfactory service and such means are illustrated in the accompanying drawings in which—

Figure 1:
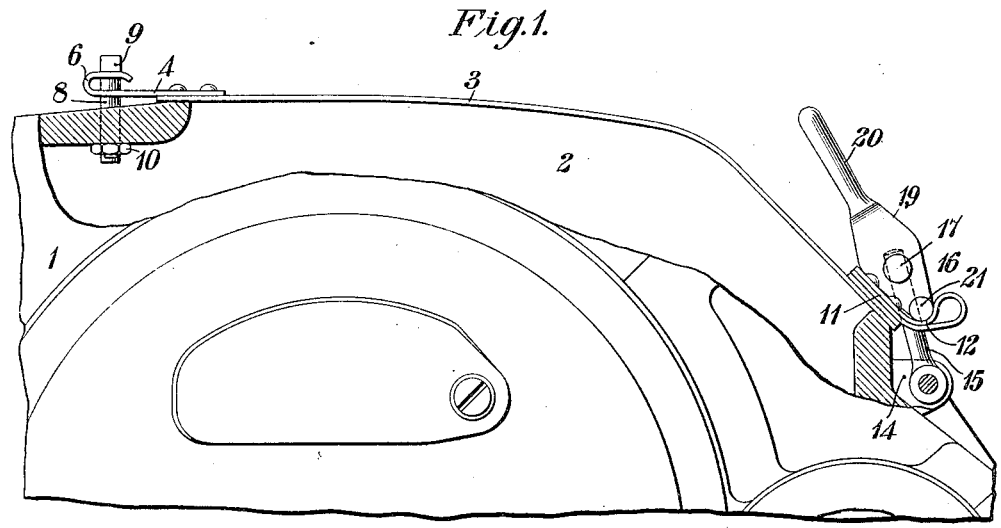
Figure 2:
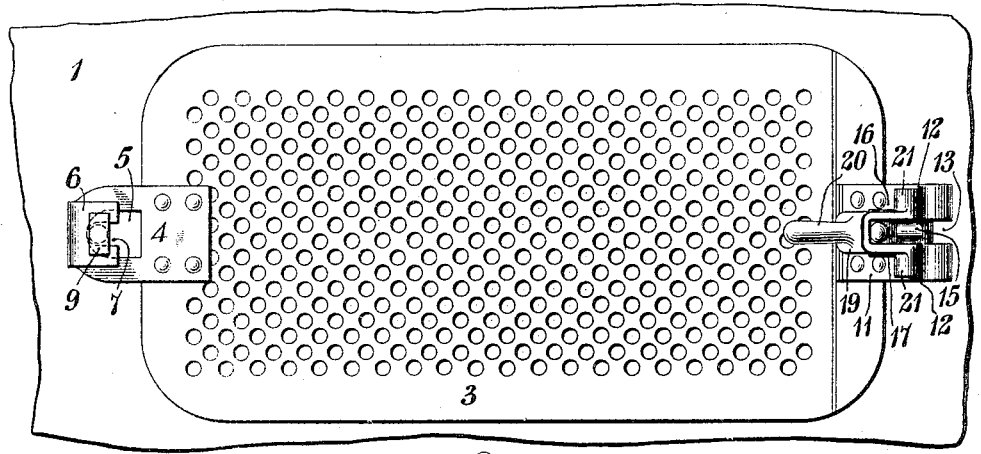
Figure 3:
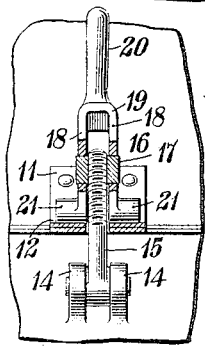

Figure 1 is an end elevation of a railway motor equipped with my invention, parts being broken away and shown in section. Fig. 2 is a plan view of the parts shown in Fig. 1 and Fig. 3 is a detail, sectional view of the locking device shown in Figs. 1 and 2.

The commutator end of the field magnet frame 1, of the electric motor here shown, is provided with an opening 2, through which access may be had to the commutator (not shown), when desired and this opening is provided with a cover plate 3, which may be a plate of imperforate sheet metal, in case the allowable temperature limit permits of the use of a completely inclosed motor, but which may be provided with perforations in case ventilation is desired or found necessary in practice. A perforated plate will serve to protect the commutator from injury by reason of foreign bodies or substances of any considerable size and is to that extent useful but, of course, an imperforate plate will be necessary to exclude dust and moisture.

Riveted to one end of the plate 3 is a sheet metal ear 4 that is provided with an opening 5 and its free end is doubled backward so as to project partially over the opening 5 but is not bent into engagement with the main portion 4. The bent-over end 6 is provided with a notch or recess 7 into which fits a bolt 8 that is located in the frame 1 adjacent to one end of the opening 2 and projects above the frame a sufficient distance to receive the portion 6 below its head 9, this head being laterally extended so as to project laterally from both sides of the notch 7 but being of such dimensions as will permit of its insertion through the opening 5 beyond the end of the bent-over portion 6. The bolt 8 is provided with a nut 10 in order that the distance which it projects above the outside of the casing may be varied to insure a close fit between the corresponding edge of the plate 3 and the edge of the motor frame adjacent to the opening 2.

The edge of the plate 3 opposite that provided with the ear 4 is provided with an ear 11 that is shown as formed of a doubled length of sheet metal and as riveted to the plate 3. The outer end of the ear is bent to form a recess 12 and is also provided with a notch or slot 13.

The motor frame is provided with a pair of lugs or ears 14 adjacent to one end of the opening 2 and between these ears is pivoted one member 15 of a toggle-joint lever 16. The free end of the member 15 is provided with a screw thread by means of which it makes adjustable engagement with a pin 17. The ends of the pin 17 are pivotally mounted in the arms 18 of the bifurcated member 19 of the toggle-joint lever 16, the outer end of the said member being provided with an operating handle 20 and its inner end being provided with two lateral, cylindrical projections 21, which engage the recesses 12 in the ear 11 when the device is in locking position, as indicated in the drawings.

The fastening structure described in the immediately preceding two paragraphs is not claimed herein but constitutes the subject-matter of a divisional application serial No. 2940, filed January 18, 1915.

By reason of the yielding, resilient character of the ears 4 and 11 and the adjustability of the fastening devices, the plate may be securely locked in position so that it can have no movement during the operation of the motor and the plate may be readily released and removed by moving the handle 20 outwardly to free the ear 11 and then moving the plate 3 rearwardly a sufficient distance to permit the bolt head 9 to pass through the opening 5 in the ear 4.

While I have shown a specific device for accomplishing the desired result, I desire it to be understood that the form, dimensions and relative location of parts may be varied within considerable limits without departing from my invention, and that the invention may be applied to machines or apparatus that differ from what is here shown and described.

I claim as my invention:

1. The combination with a casing and a cover-plate having a slot at one end and a superposed lip having a notch, of a member projecting from said casing and having a head to coöperate with said slot and said notch, and a locking means for the other end of the cover-plate.

2. The combination with a casing provided with an opening and with a projection located adjacent to one end thereof, of a cover-plate having an extension provided with a slot to receive the free end of said projection and a bent-over end provided with a notch to coöperate with the said free end, and a locking means for the opposite end of said cover-plate.

3. The combination with a frame or casing having an opening and a bolt adjacent to one side of the opening, of a cover plate provided with a resilient extension piece having a slot through which the head of the bolt will pass when the plate is longitudinally displaced from its normal position and having a notch which engages the bolt head when the plate is in its normal position, and locking means for engaging the plate at another side of the opening.

4. The combination with a frame or casing having an opening, and a projection having an enlarged outer end and located adjacent to one side of the opening, of a cover plate provided with a resilient extension piece having a slot through which the enlarged end of said projection will pass when the plate is longitudinally displaced from its normal position and having means for making a locking engagement with said enlarged end when the plate is in its normal position, and locking means for engaging said plate at another side of said opening.

In testimony whereof, I have hereunto subscribed my name this 23rd day of May, 1905.

JOHN ANDERSON.

Witnesses:
JOSEPH FRANCIS AMES,
P. P. CASEY.